(12) United States Patent
Iijima

(10) Patent No.: US 6,906,767 B1
(45) Date of Patent: Jun. 14, 2005

(54) LCD WITH DIFFUSER HAVING PARTICULAR HAZE VALUE AND DIFFUSER-REFLECTOR DISTANCE, AND REDUCED PARALLAX

(75) Inventor: Chiyoaki Iijima, Suwa (JP)

(73) Assignee: Seiko Epson Corporation (JP)

( * ) Notice: Subject to any disclaimer, the term of this patent is extended or adjusted under 35 U.S.C. 154(b) by 370 days.

(21) Appl. No.: 09/625,769

(22) Filed: Jul. 26, 2000

(30) Foreign Application Priority Data

Sep. 14, 1999 (JP) .......................... 11-261188

(51) Int. Cl.$^7$ ............................. G02F 1/1335
(52) U.S. Cl. ................ 349/113; 349/64; 349/112; 349/114
(58) Field of Search ............. 349/64, 112, 113, 349/114, 115

(56) References Cited

U.S. PATENT DOCUMENTS

| | | | | |
|---|---|---|---|---|
| 5,398,125 A | * | 3/1995 | Willett et al. | 349/95 |
| 5,686,979 A | * | 11/1997 | Weber et al. | 349/96 |
| 5,828,488 A | * | 10/1998 | Ouderkirk et al. | 359/487 |
| 5,889,570 A | * | 3/1999 | Mitsui et al. | 349/113 |
| 5,926,241 A | * | 7/1999 | Gunning, III | 349/117 |
| 5,949,506 A | * | 9/1999 | Jones et al. | 349/112 |
| 5,953,089 A | * | 9/1999 | Hiji et al. | 349/112 |

(Continued)

FOREIGN PATENT DOCUMENTS

| | | |
|---|---|---|
| CN | 1162757 | 10/1997 |
| CN | 1175704 | 3/1998 |
| EP | 0867746 | 9/1997 |
| EP | 0880049 | 4/1998 |
| JP | 07-005463 | 1/1995 |
| JP | 09-113902 | 5/1997 |
| JP | 9-506985 | 8/1997 |
| JP | 09-267424 | 10/1997 |
| JP | 10-0282899 | 1/1998 |
| JP | 11-101976 | 4/1999 |
| JP | 11-509331 | 8/1999 |
| WO | WO 95/17692 | 6/1995 |
| WO | WO 9701788 A1 | 1/1997 |
| WO | WO 97/01788 | 1/1997 |
| WO | WO 98/57221 | 12/1998 |
| WO | WO 0034822 | 6/2000 |

OTHER PUBLICATIONS

Examination results from corresponding Japanese Application No. 11-261188. No Translation.

European Search Report, EP Application No. 00306750.

Patent Abstracts of Japan re: 09113902.

Communication from Japanese Patent Office re: counterpart application.

Primary Examiner—Robert H. Kim
Assistant Examiner—Andrew Schechter
(74) Attorney, Agent, or Firm—Harness, Dickey & Pierce, P.L.C.

(57) ABSTRACT

Above a TN liquid crystal panel 140, there is provided an upper polarizing plate 130, and below it, there are sequentially provided a color filter 150, a lower polarizing plate 160, a light diffusion plate 170, a reflection polarizing plate 180, a backlight 190, and a light reflection plate 200. And the relationship between the haze value H of the light diffusion plate 170 and the distance between the light diffusion plate 170 and the light reflection plate 200 is set so as to satisfy the formula: $H \geq -200d+140$, whereby it is possible to sufficiently diffuse incident light 111 passing through the light diffusion plate 170 and reaching the light reflection plate 200; in the case of black and white display, a reduction in parallax is achieved, and in the case of color display, the reflected light can be made white.

9 Claims, 11 Drawing Sheets

U.S. PATENT DOCUMENTS

| | | | |
|---|---|---|---|
| 5,990,992 A * | 11/1999 | Hamanaka et al. | 349/95 |
| 6,016,174 A * | 1/2000 | Endo et al. | 349/43 |
| 6,124,905 A * | 9/2000 | Iijima | 349/62 |
| 6,124,971 A * | 9/2000 | Ouderkirk et al. | 359/487 |
| 6,184,949 B1 * | 2/2001 | Cornelissen et al. | 349/64 |
| 6,239,852 B1 * | 5/2001 | Oono et al. | 349/112 |
| 6,259,496 B1 * | 7/2001 | Kashima | 349/62 |
| 6,300,989 B1 | 10/2001 | Iijima | |
| 6,359,670 B1 * | 3/2002 | Broer et al. | 349/115 |
| 6,819,372 B2 * | 11/2004 | Kashima | 349/65 |

* cited by examiner

LCD WITH DIFFUSER HAVING PARTICULAR HAZE VALUE AND DIFFUSER-REFLECTOR DISTANCE, AND REDUCED PARALLAX

BACKGROUND OF THE INVENTION

1. Industrial Field of the Invention

The present invention relates to a display device and an electronic apparatus using the same and, in particular, to a reflection type liquid crystal display device which effects display by reflecting external light, and a transflective display device capable of being used both as a reflection type display device which effects display by reflecting external light and as a transmission type display device which effects display by transmitting light source light, and an electronic apparatus using the same.

2. Description of the Related Art

Hitherto, display devices using a liquid crystal panel have been of two types: reflection type display devices which effect display by using external light, and transmission type display devices in which light is applied from behind a liquid crystal panel.

In the case of a reflection type display device, the quantity of light is reduced in a dark place, so that the display is hard to see. In the case of a transmission type display device, the power consumption increases in proportion to the light source regardless of whether the place is light or dark, so that it is not particularly suitable for a portable display device or the like operated by a battery.

In view of this, a transflective display device is available, which can be used both as a reflection type and as a transmission type. In this display device, when it is used in a light place, external light impinging upon the display screen is reflected by a reflection plate provided inside the device, and while doing so, the quantity of light emitted from the display screen is controlled for each pixel by using optical elements such as a liquid crystal and a polarizing plate arranged in the optical path to effect reflection type display.

On the other hand, when this display device is used in a dark place, light source light is applied from the back side of the liquid crystal panel by a built-in light source such as a backlight, and while doing so, the quantity of light emitted from the display screen is controlled for each pixel by using the above-mentioned optical elements such as the liquid crystal and the polarizing plate to effect transmission type display.

Further, in a display device which can be used as both a reflection type and a transmission type device, TN (twisted nematic) liquid crystal, STN (super-twisted nematic) liquid crystal or the like is used for the liquid crystal with which the liquid crystal panel is filled, and according to the presence or absence of voltage applied to the pixels, the polarization axis of the liquid crystal is rotated to make the transmission polarization axis variable.

Further, the polarizing plate allows light having a linear polarization component in a predetermined direction to be transmitted therethrough.

Here, a conventional transflective display device will be described with reference to FIG. 10.

In FIG. 10, numeral 5110 indicates a voltage application region of a TN liquid crystal panel, and numeral 5120 indicates a voltage non-application region of the TN liquid crystal panel.

Numeral 5130 indicates an upper polarizing plate, numeral 5302 indicates an upper glass plate, numeral 5304 indicates a lower glass plate, numeral 5160 indicates a reflection polarizing plate, numeral 5307 indicates a semi-transmissive light absorbing plate, and numeral 5210 indicates a light source.

First, a case will be described in which black and white display is effected through reflection type display.

Incident light 5601 coming from the exterior of the display device is turned into light having a linear polarization component parallel to the plane of the drawing by the upper polarizing plate 5130, turned into light having a linear polarization component in a direction perpendicular to the plane of the drawing whose polarizing direction is twisted by approximately 90 degrees by the voltage non-application region 5120 of the TN liquid crystal panel, reflected by the reflection polarizing plate 5160 as light having a linear polarization component in a direction perpendicular to the plane of the drawing, again turned into light having a linear polarization component parallel to the plane of the drawing whose polarizing direction is twisted by approximately 90 degrees by the voltage non-application region 5120 of the TN liquid crystal panel, and emitted from the upper polarizing plate 5130. Thus, when no voltage is applied to the TN liquid crystal panel, white display is effected.

On the other hand, incident light 5603 coming from the exterior of the display device is turned into light having a linear polarization component in a direction parallel to the plane of the drawing by the upper polarizing plate 5130, transmitted as light having a linear polarization component parallel to the plane of the drawing without changing the polarizing direction by the voltage application region 5110 of the TN liquid crystal panel, and then absorbed by the semi-transmissive light absorbing plate 5307, with the result that black display is effected.

Next, a case will be described in which black and white display is effected through transmission type display. Light 5602 from the light source 5210 is transmitted through an opening formed in the semi-transmissive light absorbing plate 5307, turned into light having a linear polarization component in a direction parallel to the plane of the drawing by the reflection polarizing plate 5160, turned into light having a linear polarization component perpendicular to the plane of the drawing whose polarizing direction is twisted by approximately 90 degrees by the voltage non-application region 5120 of the TN liquid crystal panel, and absorbed by the upper polarizing plate 5130 to effect black display.

On the other hand, light 5604 from the light source 5210 is transmitted through the opening formed in the semi-transmissive light absorbing plate 5307, turned into light having a linear polarization component in a direction parallel to the plane of the drawing by the reflection polarizing plate 5160, and transmitted through the voltage application region 5110 of the TN liquid crystal panel as light having a linear polarization component in a direction parallel to the plane of the drawing without changing the polarizing direction to effect white display.

Generally speaking, in a display device using a liquid crystal panel, the thickness of the liquid crystal layer is as small as 5 to 10 $\mu$m. In contrast, the thickness of the substrate is 0.3 to 0.7 mm, which is very large as compared with the thickness of the liquid crystal layer.

Thus, when reflection type display is performed by using the above-described conventional display device, there is a marked difference in the optical path in the liquid crystal layer of the external light coming from above the liquid crystal panel between going and returning paths. Thus, depending upon the angle of incidence of the external light impinging upon the liquid crystal panel, the pixel that the external light passes in the going path differs from the pixel it passes in the returning path. When this difference in optical path is observed obliquely by the observer, a shadow is generated in the display in the case of black and white display, in which no color filter is used. This phenomenon is called parallax. In a display device using a color filter of a plurality of colors, the color the light passes in the going path differs from the color it passes in the returning path, resulting in color mixing.

While in the above-described prior art only a transflective display device has been shown, such problems are equally involved in a reflection type display device formed by removing the light source 5210 from the display device of FIG. 11 and replacing the semi-transmissive light absorbing plate 5307 by a light absorbing plate.

It is the first object of the present invention to provide a reflection type or a transflective display device in which a reduction is achieved in terms of parallax and color mixing generated in reflection type display.

Further, in the conventional transflective display device shown in FIG. 10, the semi-transmissive light absorbing plate 5307 is adopted, so that when effecting transmission type display, a part or the major part of the light emitted from the light source 5210 is absorbed by the semi-transmissive light absorbing plate 5307. Thus, the light emitted from the light source 5210 cannot be effectively utilized to a sufficient degree, with the result that the display is rather dark.

It is the second object of the present invention to provide a display device in which the light emitted from the light source is effectively utilized and which is capable of effecting bright transmission type display.

Further, in the above-described display device using a reflection polarizer, positive display is effected at the time of reflection type display and negative display is effected at the time of transmission type display based on the above display principle, resulting in a so-called positive/negative inversion.

It is the third object of the present invention to prevent this positive/negative inversion in a transflective display device using a reflection polarizer.

SUMMARY OF THE INVENTION

To achieve the above objects, there is provided, in accordance with the present invention, a display device comprising a liquid crystal panel consisting of substrates and a liquid crystal placed therebetween, first polarizing means provided on one side of the liquid crystal panel, light reflection means provided on the other side of the liquid crystal panel, and light diffusion means arranged between the liquid crystal panel and the light reflection means, wherein the light diffusion means has forward scattering characteristics, and wherein assuming that the distance between the light diffusion means and the light reflection means is d (mm) and that the haze value of the light diffusion means is H (%), the following condition is satisfied: $H \geq -200d+140$.

In the display device of the present invention, the external light impinging upon the liquid crystal panel from above is sufficiently diffused by light diffusion means having forward scattering characteristics, and then reflected by light reflection means spaced apart from the light diffusion means by a predetermined distance. After this, it is sufficiently diffused by the light diffusion means, and applied to the liquid crystal panel from behind. Thus, at no matter what angle of incidence the external light may impinge upon the liquid crystal panel, it is reflected by the light reflection means and the light applied to the liquid crystal panel from behind is a sufficiently diffused light, so that no parallax is generated.

Further, in an aspect of the present invention, a color filter is provided between the first polarizing means and the light diffusion means, the color filter being equipped with a plurality of coloring layers.

In the display device of this embodiment, external light impinging upon the liquid crystal panel is temporarily colored in a plurality of colors by the color filter. After this, however, it is sufficiently diffused by the light diffusion means having forward scattering characteristics and the plurality of colors are mixed with each other. Then, the light is reflected by the light reflection means and applied to the liquid crystal panel from behind. This light, which is applied to the liquid crystal panel from behind, is a light consisting of a plurality of colors mixed together and akin to white color, so that no color mixing occurs at no matter angle of incidence the external light may impinge upon the liquid crystal panel.

Further, in another aspect of the present invention, the color filter has a red type, a green type and a blue type coloring layers.

In the display device of this embodiment, the external light impinging upon the liquid crystal panel is colored in a plurality of colors by the color filter having red type, green type and blue type coloring layers, and then diffused by the light diffusion means. In the process, red, blue and green are mixed together, so that the diffused light is very close to white light. And, since the white light is applied to the liquid crystal panel from behind, it is possible to obtain a display superior in color balance.

In still another aspect of the present invention, there is provided between the liquid crystal panel and the light reflection means a second polarizing means for separating incident light according to its polarization components.

In the display device of this embodiment, the external light transmitted through the liquid crystal panel is polarized and separated by the second polarizing means to thereby effect bright/dark display.

As the second polarizing means, it is desirable to adopt a polarizing means which substantially allows light of a first linear polarization component to be transmitted and which substantially absorbs light of a second linear polarization component substantially perpendicular to the first linear polarization component.

By adopting such a polarizing means, the external light transmitted through the liquid crystal panel is absorbed by the second polarizing means to effect dark display, and it is transmitted through the second polarizing means and then reflected to thereby effect bright display, so that a reflection type display very superior in contrast characteristics is realized.

In a further aspect of the invention, there is further provided an illuminating device having a light transmissive light guiding member and a light source capable of introducing light to the light guiding member, the illuminating device being arranged between the light diffusion means and the light reflection means.

The display device of this embodiment relates to a socalled transflective display device in which it is possible to effect transmission type display using light source light when it is dark, and reflection type display using external light when it is bright. According to the display device of this embodiment, a transflective display device which is free from parallax or color mixing and which is capable of reflection type display is realized. Further, in transmission type display also, the light emitted from the light source is sufficiently diffused by the light diffusion means having forward scattering characteristics, so that it is possible to uniformly apply light to the liquid crystal panel. Further, due to the thickness of the light guiding member, the light scattering means and the light reflection means are spaced apart from each other, so that the above-mentioned distance d is secured.

In a further aspect of the present invention, there is provided between the liquid crystal panel and the illuminating device second polarizing means for separating incident light according to its polarization component, wherein there is provided a reflection polarizer which is arranged between the second polarizing means and the illuminating device and which substantially allows light of a first linear polarization component to be transmitted therethrough and substantially reflects light of a second linear polarization component that is substantially orthogonal to the first linear polarization component, and wherein the transmission axis of the reflection polarizer and the transmission axis of the second polarizing means substantially coincide with each other.

In the display device of this embodiment, of the light emitted from the illuminating device, the light whose polarizing direction is equal to the transmission axis direction of the reflection polarizer is transmitted through the reflection polarizer. On the other hand, the light whose polarizing direction is equal to the reflection axis of the reflection polarizer is reflected by the reflection polarizer. And, it is reflected by the light reflection means and returns to the reflection polarizer. As it repeats this reflection, it is sooner or later transmitted through the reflection polarizer. That is, most of the light emitted from the illuminating device is emitted toward the second polarizing means as light whose polarizing direction is equal to the direction of the transmission axis of the reflection polarizer. And, this light is transmitted through the second polarizing means whose transmission axis is set to be parallel to the transmission axis of the reflection polarizer, and emitted toward the liquid crystal panel. Thus, a bright transmission type display is realized which is very superior in the utilization efficiency of the light emitted from the illuminating device. Since the transmission axis of the reflection polarizer is aligned with the transmission axis of the second polarizing means, the external light impinging the liquid crystal panel from above is not adversely affected by the reflection polarizer, so that a so-called positive/negative inversion does not occur.

Further, in accordance with the present invention, there is provided an electronic apparatus equipped with a display device comprising a liquid crystal panel consisting of substrates and a liquid crystal placed therebetween, first polarizing means provided on one side of the liquid crystal panel and adapted to separate incident light according to its polarization component, light reflection means provided on the other side of the liquid crystal panel, and light diffusion means arranged between the liquid crystal panel and the light reflection means, wherein the light diffusion means has forward scattering characteristics, and wherein assuming that the distance between the light diffusion means and the light reflection means is d (mm) and that the haze value of the light diffusion means is H (%), the following condition is satisfied: $H \geq -200d + 140$.

With the electronic apparatus of the present invention, it is possible to realize an electronic apparatus which is free from parallax or color mixing.

DETAILED DESCRIPTION OF THE PREFERRED EMBODIMENTS

Figure 1:
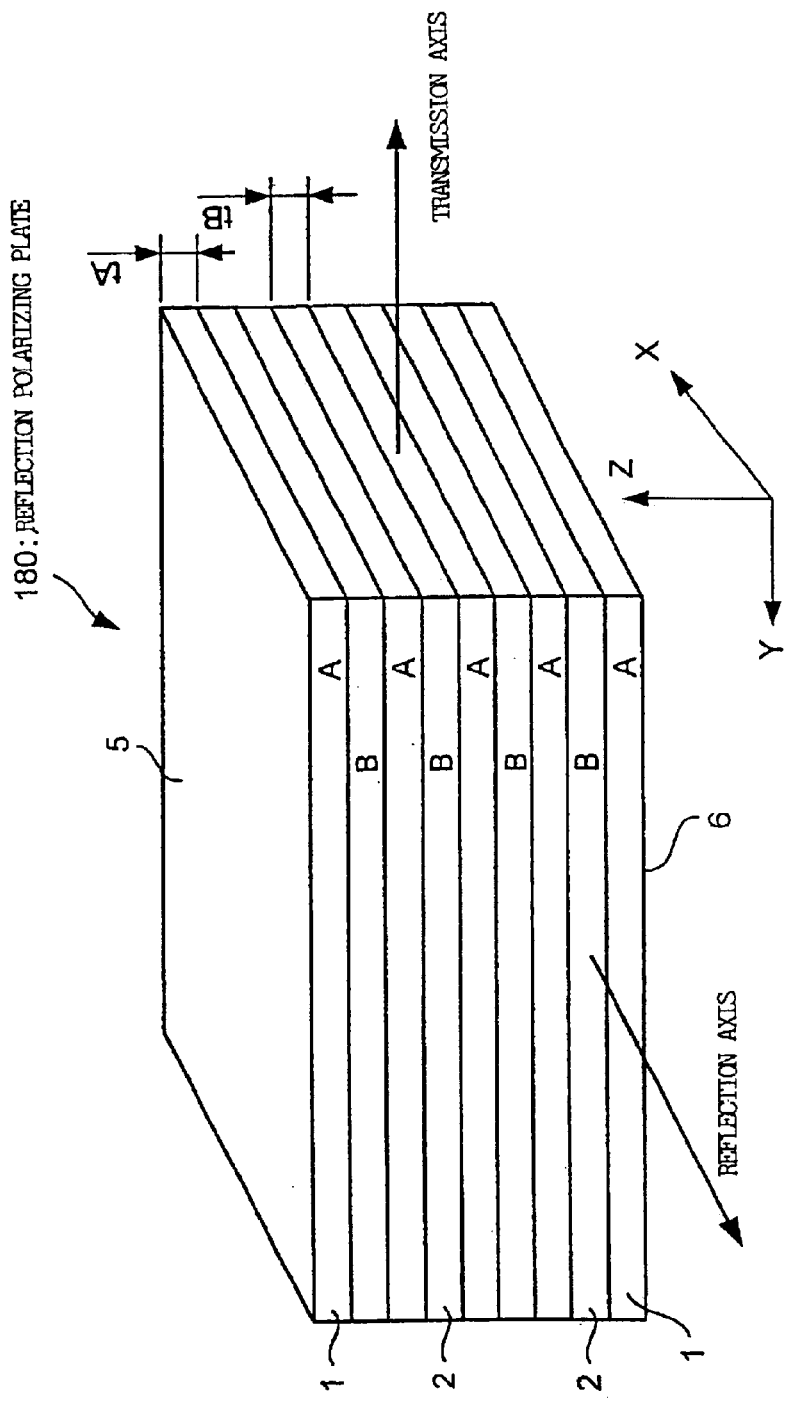
FIG. 1 is a perspective view showing a reflection polarizing plate used in a display device according to the present invention.

Next, the display principle of the display device of the present invention will be described in detail with reference to FIGS. 2 and 3. While in the following a transflective display device is described by way of example, the reflection principle is the same in a reflection type display device.

This liquid crystal display device uses a TN liquid crystal panel 140 as the transmission polarization axis variable optical element. Further, above the TN liquid crystal panel 140, there is provided an upper polarizing plate 130, and below the TN liquid crystal panel 140, there are sequentially provided a color filter 150 composed of RGB (red, green, blue), a lower polarizing plate 160, a light diffusion plate 170, and a reflection polarizing plate 180. Further, below the reflection polarizing plate 180, there are sequentially provided a backlight 190 serving as the light source, and a light reflection plate 200.

The transmission axis of the upper polarizing plate 130 and the transmission axis of the lower polarizing plate 160 are substantially orthogonal to each other, and the transmission axis of the lower polarizing plate 160 and the transmission axis of the reflection polarizing plate 180 are parallel to each other. The light diffusion plate 170 effects forward scattering having a haze value H.

Numeral 141 on the left-hand side indicates a voltage non-application region where no voltage is applied to the TN liquid crystal panel 140, and numeral 142 on the right-hand side indicates a voltage application region where voltage is applied thereto.

Next, the operation of reflection type display by the display device constructed as described above will be described with reference to FIG. 2.

First, a case will be described in which light entering from outside passes through the voltage non-application region 141 of the TN liquid crystal panel 140.

Of the incident light 111 entering the display device from outside, only the light having a linear polarization component parallel to the plane of the drawing is transmitted through the upper polarizing plate 130. After this, the light is turned into light having a linear polarization component in a direction perpendicular to the plane of the drawing whose polarizing direction is twisted by approximately 90 degrees by the voltage non-application region 141 of the TN liquid crystal panel 140, and transmitted through the color filter 150, the lower polarizing plate 160, the light diffusion plate 170 and the reflection polarizing plate 180 as a linear polarization component in a direction perpendicular to the plane of the drawing before it passes through the transparent backlight 190, reaching the light reflection plate 200, by which it is reflected. And, of the light reflected by the light reflection plate 200, only light 112 having a linear polarization component perpendicular to the plane of the drawing is again transmitted through the backlight 190, the reflection polarizing plate 180, the light diffusion plate 170, the lower polarizing plate 160, and the color filter 150, and its polarizing direction is twisted by approximately 90 degrees by the voltage non-application region 141 to be turned into light having a linear polarization component parallel to the plane of the drawing, and this light is output as output light 113.

The light reflected by the light reflection plate 200 includes not only the light 112 having a linear polarization component in a direction perpendicular to the plane of the drawing, but also light 114 having a linear polarization component parallel to the plane of the drawing. Thus, this light 114 is reflected by the reflection polarizing plate 180, again reflected by the light reflection plate 200 to be changed in polarizing direction, and partly turned into light 115 having a linear polarization component in a direction perpendicular to the plane of the drawing before it passes through the reflection polarizing plate 180. By repeating this, it is possible to effectively utilize the light, and the output light 113 output from the upper polarizing plate 130 can be made approximately 1.6 times as bright as that in the case in which the reflection polarizing plate 180 is not used.

Here, it seems that the incident light 111 and the output light 113 are passed through the color filter 150 of different colors. However, since the light diffusion plate 170 is provided between the lower polarizing plate 160 and the reflection polarizing plate 180, the light having passed through the color filter 150 of each color is diffused when passing through the light diffusion plate 170. Thus, the light reflected by the light reflection plate 200 consists of red, green and blue mixed together, and there is no strong coloring of any particular color. As a result, the light 113 emitted fron the upper polarizing plate 130 is colored in the color of the color filter 150 through which the light reflected by the light reflection plate 200 passes.

Next, a case will be described in which light entering from outside passes the voltage application region 142 of the TN liquid crystal panel 140.

Of the incident light 116 entering from the exterior of the display device, only the light having a linear polarization component parallel to the plane of the drawing is transmitted through the upper polarizing plate 130. After this, the light passes the voltage application region 142 of the TN liquid crystal panel 140 without changing the polarizing direction, passes through the color filter 150 and becomes darker due to absorption by the lower polarizing plate 160.

In this way, in the voltage non-application region 141, the light entering the display device can be effectively utilized by the reflection polarizing plate 180, and the light reflected by the light reflection plate 200 is output as the output light 113 colored by the color filter 150. On the other hand, in the voltage application region 142, the light becomes darker due to absorption by the lower polarizing plate 160.

Next, the operation of transmission type display will be described with reference to FIG. 3.

First, a case will be described in which the light output from the backlight 190 passes the voltage non-application region of the TN liquid crystal panel 140.

Of the light source light generated by the backlight 190, the light 121 having a linear polarization component perpendicular to the plane of the drawing passes the reflection polarizing plate 180, the light diffusion plate 170, the lower polarizing plate 160, and the color filter 150, and is turned into light having a linear polarization component in a direction parallel to the plane of the drawing whose polarizing direction is twisted by approximately 90 degrees by the voltage non-application region 141 of the TN liquid crystal panel 140, the light being output from the upper polarizing plate 130 as the output light 122.

Further, the light source light from the backlight 190 includes not only the light 121 having a linear polarization component in a direction perpendicular to the plane of the drawing, but also the light 123 having a linear polarization component in a direction parallel to the plane of the drawing. Thus, the light 123 is reflected by the reflection polarizing plate 180, and reflected by the light reflection plate 200 to change the polarizing direction, a part of it passing the reflection polarizing plate 180 as light 124 having a linear polarization component in a direction perpendicular to the plane of the drawing. By repeating this, it is possible to effectively utilize light and make the output light 122 brighter.

Next, a case will be described in which the light source light from the backlight 190 passes the voltage application region 142 of the TN liquid crystal panel 140.

Of the light source light of the backlight 190, the light 125 having a linear polarization component in a direction perpendicular to the plane of the drawing passes through the reflection polarizing plate 180, the light diffusion plate 170, the lower polarizing plate 160, and the color filter 150. After this, the light passes the voltage application region 142 of the TN liquid crystal panel 140 without changing its polarizing direction, and is absorbed by the upper polarizing plate 130 to become darker.

Further, of the light source light from the backlight 190, the light 126 having a linear polarization component in a direction parallel to the plane of the drawing is reflected by the reflection polarizing plate 180, reflected by the light reflection plate 200 to change its polarizing direction, partly becomes a light 127 having a linear polarization component in a direction perpendicular to the plane of the drawing before it passes the reflection polarizing plate 180. However, this light 127 also passes the voltage application region 142 of the TN liquid crystal panel 140 without changing its polarizing direction, is absorbed by the upper polarizing plate 130 to become darker.

In this way, due to the combination of the voltage application and non-application of the TN liquid crystal panel 140, the output light 113 and 122 colored by the color filter 150 is emitted.

Figure 2:
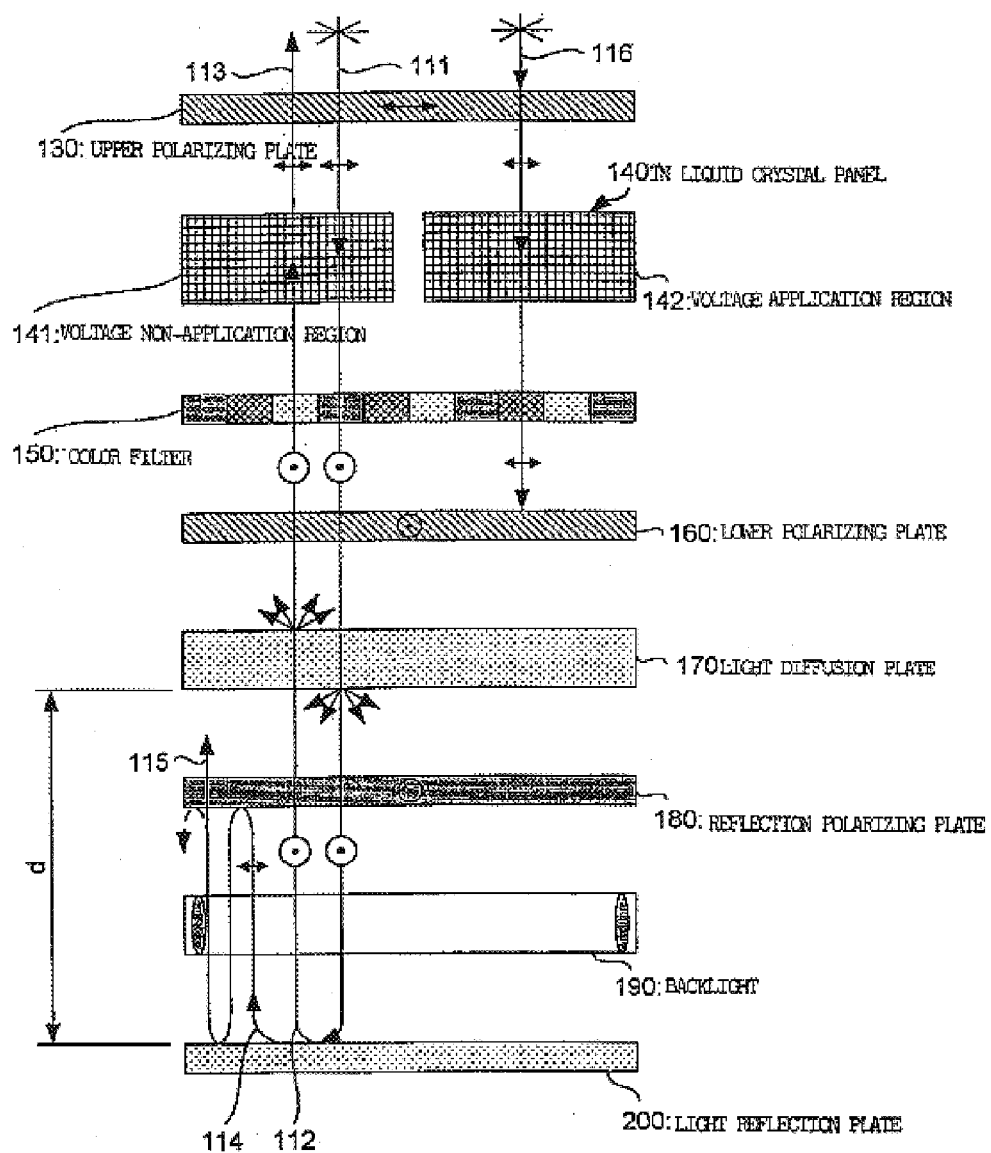
FIG. 2 is a diagram illustrating the reflection type display principle in the present invention.
Figure 3:
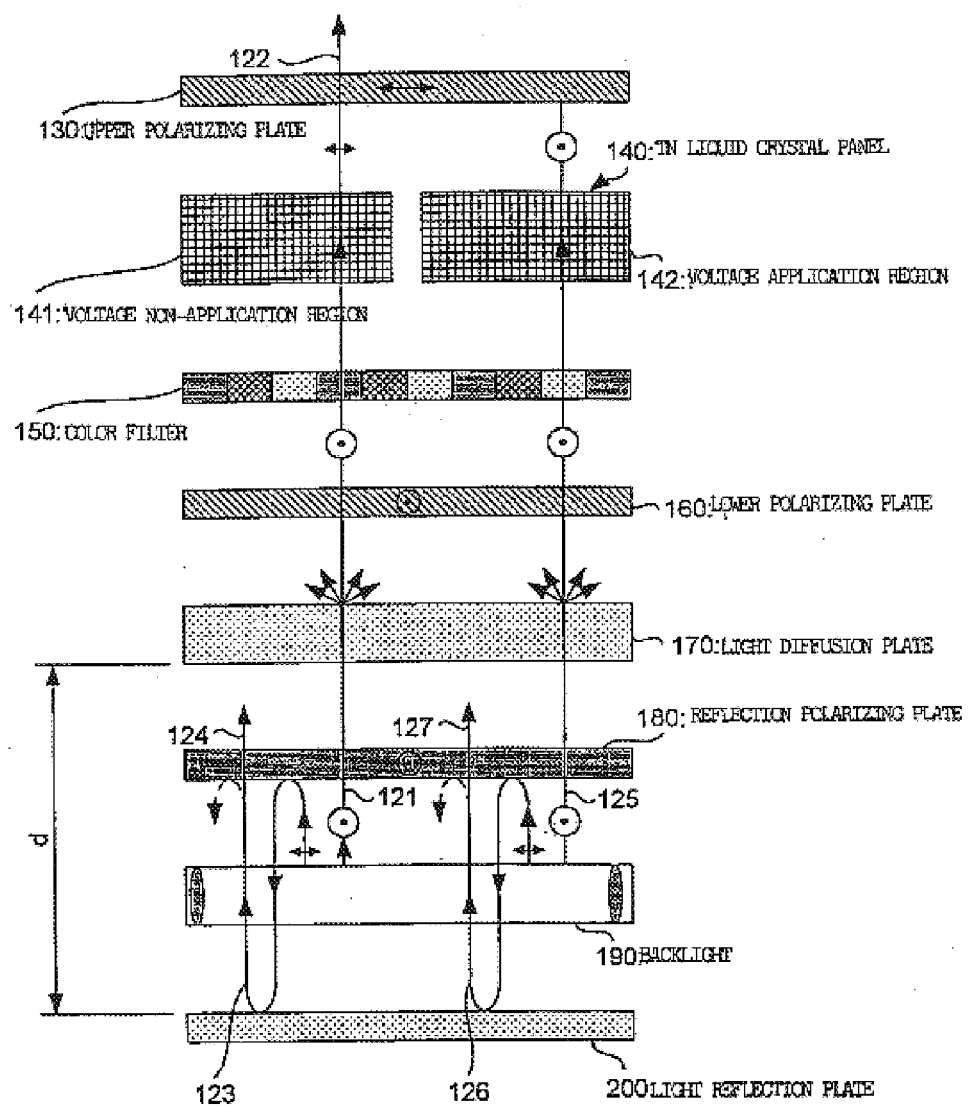
FIG. 3 is a diagram illustrating the transmission type display principle in the present invention.

Further, since in the display device of the present invention the light diffusion plate 170 and the light reflection plate 200 are provided, light having a linear polarization component parallel to the plane of the drawing like the incident light 111 shown in FIG. 2 passes, for example, the red portion of the color filter 150, whereby it is colored in red and passes through the lower polarizing plate 160, the light diffusion plate 170, the reflection polarizing plate 180 and the backlight 190 to reach the light reflection plate 200. This red light has undergone forward scattering when passing the light diffusion plate 170, so that the light reaching the light reflection plate 200 consists not only the light having passed the red color filter 150, but of a mixture of lights having passed through the green and blue filters to be colored in green and blue, becoming akin to white light. Thus, in FIG. 2, the light 112 reflected by the light reflection plate 200 might seem to be red. However, the lights diffused by the light diffusion plate 160 and colored in the other colors (green and blue) are similarly reflected, so that the reflected light is white. And, this white light is again passed through the backlight 190, the reflection polarizing plate 180, the light diffusion plate 170, and the lower polarizing plate 160 to pass a particular color portion (for example, green) of the color filter 150 and is transmitted through the liquid crystal panel 140 and the upper polarizing plate 130, the output light being colored in green.

Figure 4:
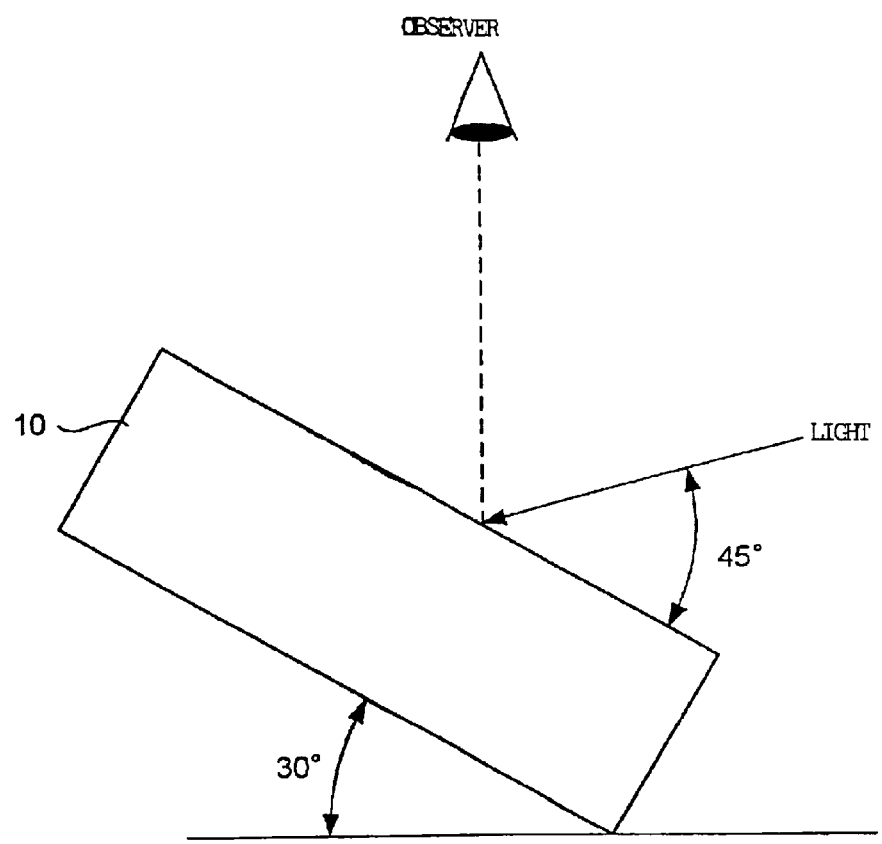
FIG. 4 is a diagram illustrating a parallax measurement experiment.

Further, the present inventor conducted an experiment to reduce the parallax generated when effecting black and white display by reflection type display in the display device constructed as described above. As shown in FIG. 4, in this experiment, the display device was inclined by 30 degrees, and incident light was applied from a direction inclined by 45 degrees with respect to the display device, and the observer observed the parallax from right above to obtain the experiment results as shown in Table 1. In Table 1, the haze value H indicates the diffusion ratio (5 to 95%) of the light diffusion plate 170, and the distance d indicates the distance (mm) between the light diffusion plate 170 and the light reflection plate 200.

TABLE 1

|  |  | Distance d | | | | | |
| --- | --- | --- | --- | --- | --- | --- | --- |
|  |  | 0.7 | 0.6 | 0.5 | 0.4 | 0.3 | 0.2 |
| Haze | 15 | B | C | C | C | C | C |
| Value | 24 | A | B | C | C | C | C |
|  | 47 | A | A | A | C | C | C |
|  | 82 | AA | A | A | A | B | C |
|  | 95 | AA | A | A | A | A | C |

In Table 1,
AA: Shadow is blurred, and display is clear
A: Shadow is blurred
B: Somewhat conspicuous shadow is seen
C: Shadow is clearly seen From this Table 1, the relationship between the haze value H and the distance d can be expressed as follows:

$$H \geq -200d + 140 \quad (1)$$

Thus, the display device is constructed so as to satisfy this formula (1).

Due to this arrangement, the light diffusion plate 170 can apply the light emitted from the diffusion plate 170 to the light reflection plate 200 in a sufficiently diffused state, thereby reducing the parallax generation.

On the other hand, when effecting color display by reflection type display, the incident light is colored when it passes the color filter 150; when the light is reflected by the light reflection plate 200 without being sufficiently diffused by the light diffusion plate 170, the light again impinging upon the TN liquid crystal panel 140 is mixed with the previously colored light as a base color, resulting in a display with inconsistency in color.

In view of this, by setting the display device so as to satisfy formula (1), it is possible for the lights reaching the light reflection plate 200 and colored in red, green and blue to be sufficiently diffused, whereby the light reflected by the light reflection plate 200 can be white light consisting of red, green and blue uniformly mixed together. As a result, by making the light applied from behind to the liquid crystal panel 140 at the time of reflection type display white light, it is possible to realize a clear color display free from color inconsistency.

When the color filter 150 is dot matrix display type consisting of red, green and blue, multicolor display, and further, a full color display, are possible.

While a normally white mode has been described, it may also be a normally black mode. Further, in the normally white mode, the display is made bright due to the reflection polarizing plate 180 and the light reflection plate 200 whether it is reflection type display or transmission type display.

Further, while in the above construction, the TN liquid crystal panel 140 has been described by way of example, the basic operational principle is the same if, instead of the TN liquid crystal panel 140, other types of panels which can vary the transmission polarization axis through voltage, etc., such as an STN liquid crystal panel or an ECB (electrically controlled birefringence) liquid crystal panel.

Further, while in the above display device the reflection polarizing plate 180 is provided between the light diffusion plate 170 and the backlight 190 to make the output light 113, 122 bright, it is possible to omit the reflection polarizing plate 180.

Further, it is also possible to construct a reflection type display device in which the backlight 190 is omitted.

Next, the principle of the reflection polarizing plate will be described with reference to FIGS. 1 through 3. FIG. 1 is a schematic perspective view of a reflection polarizing plate serving as reflection polarizing means, and FIGS. 2 and 3 are schematic diagrams showing a display device using this reflection polarizing plate.

First, the construction of the reflection polarizing plate 180 will be described with reference to FIG. 1. The reflection polarizing plate 180 is formed as a laminate composed of a plurality of two different kinds of layers, layers 1 (A-layers) and layers 2 (B-layers) alternately stacked together. In the layers 1 and 2, the refractive index (nAX) in the X-direction of the A-layers 1 is different from the refractive index (nAY) in the Y-direction thereof, and the refractive index (nAY) in the Y-direction of the A-layers 1 is substantially the same as the refractive index (nBY) in the Y-direction of the B-layers 2.

Thus, of the light impinging upon the reflection polarizing plate 180 from a direction perpendicular to the upper surface 5 of the reflection polarizing plate 180, the light having a linear polarization component in the Y-direction is transmitted through the reflection polarizing plate 180, and output from the lower surface 6 as light having a linear polarization component in the Y-direction. Conversely, of the light impinging upon the reflection polarizing plate 180 from a direction perpendicular to the lower surface 6 of the reflection polarization plate 180, the light having a linear polarization component in the Y-direction is transmitted through the reflection polarizing plate 180 and output from the upper surface 5 as light having a linear polarization component in the Y-direction. Here, the direction in which light is transmitted (the Y-direction) will be referred to as the transmission axis.

On the other hand, assuming that the thickness in the Z-direction of the A-layers 1 is tA, that the thickness in the Z-direction of the B-layers 2 is tB, and that the wavelength of the incident light is λ, the reflection polarizing plate 180 is formed so as to satisfy the following equation:

$$tA \cdot nAX + tB \cdot nBX = \lambda/2 \tag{2}$$

Due to this arrangement, of the light impinging upon the reflection polarizing plate 180 from a direction perpendicular to the upper surface 5 of the reflection polarizing plate 180 and having a wavelength X, the light having a linear polarization component in the X-direction is reflected by the reflection polarizing plate 180. Further, of the light impinging upon the reflection polarizing plate 180 from a direction perpendicular to the lower surface 6, the light having a linear polarization component in the X-direction is reflected by the reflection polarizing plate 180. Here, the direction in which light is reflected (the X-direction) will be referred to as the reflection axis.

And, in the reflection polarizing plate 180, the thickness tA in the Z-direction of the A-layers 1 and the thickness tB in the Z-direction of the B-layers 2 are varied to make equation (2) hold true over the entire wavelength region of visible light, whereby not only light of a single color but also light having a linear polarization component in the X-direction over the entire white light range is reflected as light having a linear polarization component in the X-direction, and the light having a linear polarization component in the Y-direction is transmitted as light having a linear polarization component in the Y-direction.

The A-layers of the reflection polarizing plate 180 is formed by drawing, for example, PEN (polyethylene naphthalate), and the B-layers can be formed of coPEN (copolyester of naphthalene dicarboxylic acid and terephthalic or isothalic acid). The materials of the reflection polarizing plate 180 used in the present invention are not restricted to the above, but it is possible to select appropriate materials. Further, such a reflection polarizing plate is disclosed in detail as a reflection polarizer in, for example, Japanese Unexamined Patent Application Publication No. 9-506985.

Next, embodiments of the present invention will be described with reference to the drawings.

Figure 5:
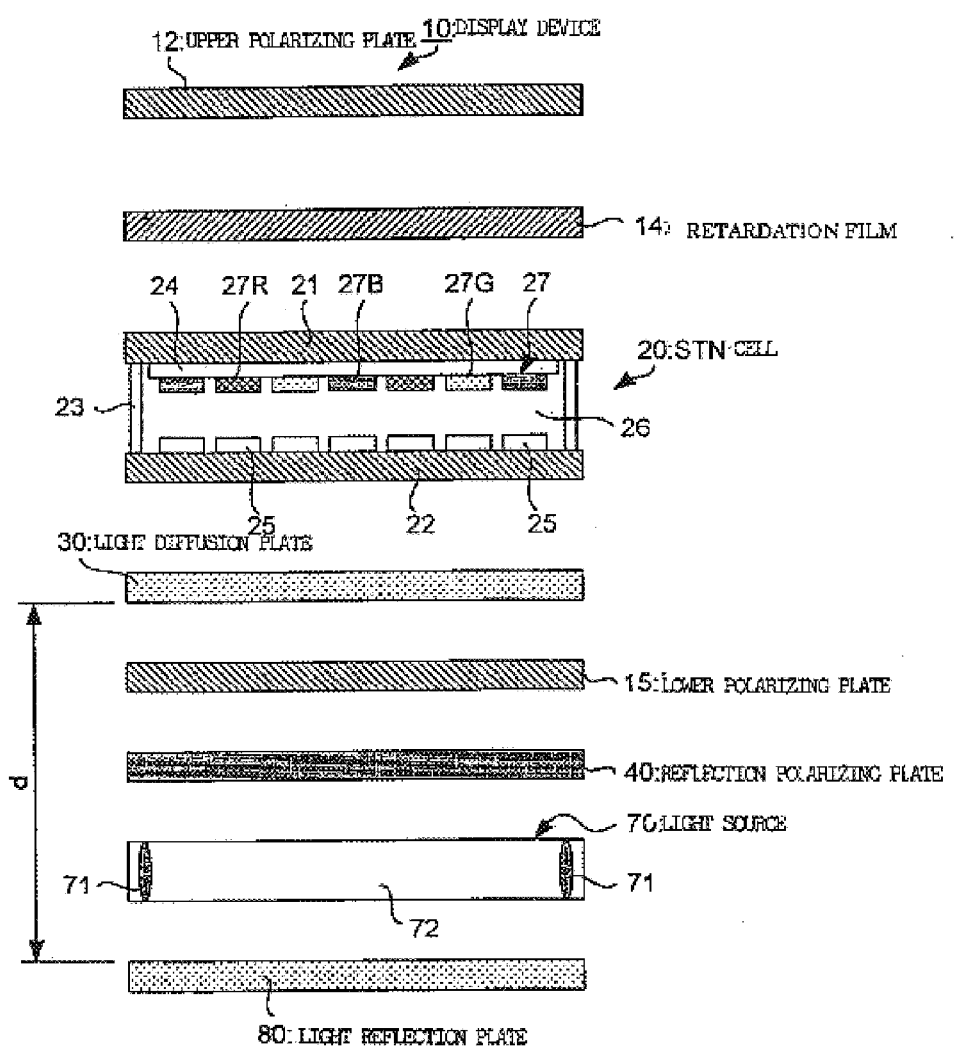
FIG. 5 is a schematic diagram showing the construction of a display device according to the first embodiment.

FIG. 5 is a schematic diagram showing a color display device 10 according to a first embodiment. The display device 10 uses an STN cell 20 as transmission polarization axis variable means. Further, above the STN cell 20, a retardation film 14 and an upper polarizing plate 12 are sequentially provided, and below the STN cell 20, a light diffusion plate 30 and a lower polarizing plate 15 are sequentially provided. Further, below the lower polarizing plate 15, a reflection polarizing plate 40, a light source 70 and a light reflection plate 80 are sequentially provided.

Here, the light source 70 uses an LED (light emitting diode) 71, emitting light upwardly by a light guiding member 72. The light guiding member 72 is formed of a transparent resin such as acrylic resin, polycarbonate resin or amorphous polyolefine, an inorganic transparent material such as glass, or a composite thereof, and has a thickness of approximately 0.3 mm to 2 mm. Further, a plurality of small protrusions are formed on the surface of the light guiding member 72, and in view of the fact that the wavelength of visible light is approximately 380 nm to 700 nm, the size of each protrusion should be not less than approximately 5 μm in order that no influence due to diffraction may be generated; for the protrusions to be of a size not conspicuous to the naked eye, it is desirable for their size to be not less than 300 μm.

The light reflection plate 80 is formed by effecting aluminum evaporation or silver evaporation on a PET film or using an aluminum foil or the like.

Further, regarding the STN cell 20, an STN liquid crystal 26 is sealed in a cell formed by two glass substrates 21 and 22 and a seal member 23 to form a liquid crystal panel. Further, on the lower surface of the glass substrate 21, a transparent electrode 24 is formed, and on the upper surface of the glass substrate 22, transparent electrodes 25 are provided to form a dot matrix. The transparent electrodes 24 and 25 are formed of ITO (indium tin oxide), tin oxide or the like. Further, on the lower surface of the transparent electrode 24, a color filter 27 is formed, which consists of red 27R, green 27G and blue 27B, which coincide with the electrode pattern of the transparent electrodes 25. Instead of being formed on the lower surface of the transparent electrode 24, the color filter 27 may be formed between the glass substrate 21 and the transparent electrode 24.

The retardation film 14 is used as an optical anisotropic member for color correction, correcting the coloring generating in the STN cell 20 to make black and white display possible.

The reflection polarizing plate 40 of this embodiment is the same as the reflection polarizing plate 180 described with reference to FIG. 1, the direction of the transmission axis of the reflection polarizing plate 40 substantially coinciding with the direction of the transmission axis of the lower polarizing plate 15.

Further, in the display device 10 of this embodiment, equation (2) is satisfied. In the display device 10, the haze value H of the light diffusion plate 30 is, for example, 82%, and the distance d between the light diffusion plate 30 and the light reflection plate 80 is, for example, 0.7 mm in order that formula (1) may be satisfied.

Next, the operation of the display device 10 of this embodiment will be described.

First, in the voltage non-application region of the STN cell 20 in reflection type display, light entering from outside is turned into light having a linear polarization component in a predetermined direction by the upper polarizing plate 12. After this, it is turned into light having a linear polarization component whose polarizing direction is twisted by a predetermined angle by the STN cell 20, passes the light diffusion plate 30, the lower polarizing plate 15 and the reflection polarizing plate 40, and further passes the light guiding member 72 to be reflected by the light reflection plate 80. The reflected light again passes the light guiding member 72, the reflection polarizing plate 40, the lower polarizing plate 15 and the light diffusion plate 30, and light having a linear polarization component whose polarizing direction is twisted by a predetermined angle by the STN cell 20 is output from the upper polarizing plate 12.

Further, of the light reflected by the light reflection plate 80, even light whose polarizing direction is changed repeats reflection between the reflection polarizing plate 40 and the light reflection plate 80, and is eventually output from the reflection polarizing plate 40 toward the STN cell 20, so that it is possible to obtain bright display. In the process, when the reflected light passes the color filter 27, it is possible to color the light in one of the colors, red, green and blue.

In the voltage application region of the STN cell 20, light entering from outside is turned into light having a linear polarization component in a predetermined direction by the upper polarizing plate 12. After this, the light passes the STN cell 20 as light having this linear polarization component, and is absorbed by the lower polarizing plate 15 to become darker.

Next, in the voltage non-application region of the STN cell 20 in transmission type display, the light emitted from the light source 70 is turned into light having a linear polarization component in a predetermined direction by the reflection polarizing plate 40 and transmitted, and is turned into light having a linear polarization component whose polarizing direction is twisted by a predetermined angle by the STN cell 20 before it is output through the upper polarizing plate 12. In this process, the output light is colored in the color of the color filter 27 it passes.

On the other hand, in the voltage application region of the STN cell 20, the light emitted from the light source 70 is transmitted as light having a linear polarization component in a predetermined direction by the reflection polarizing plate 40, passes the STN cell 20 as light having this linear polarization component before it is absorbed by the upper polarizing plate 12.

In this way, in the display device 10 of this embodiment, in both reflection type display and transmission type display, it is possible to realize a bright color display by the color filter 27 of the three colors, red, green and blue.

Further, in the display device 10 of this embodiment, the relationship between the diffusion ratio of the light diffusion plate 30 (haze value H) and the distance d between the light diffusion plate 30 and the light reflection plate 80 satisfies formula (1), whereby it is possible for the light diffusion plate 30 to apply light colored in red, green and blue by the color filter 27 to the light reflection plate 80 in a sufficiently diffused state, making it possible to make the light reflected by the light reflection plate 80 white light consisting of red, green and blue mixed together.

For example, of the incident light, the light colored in red when passing the red portion 27R of the color filter 27 reaches the light reflection plate 80 in a state sufficiently diffused by the light diffusion plate 30. The light colored in green when passing the green portion 27G of the color filter 27 reaches the light reflection plate 80 in a state sufficiently diffused by the light diffusion plate 30. Further, the light colored in blue when passing the blue portion 27B of the color filter 27 reaches the light reflection plate 80 in a state sufficiently diffused by the light diffusion plate 30. Here, the lights of these three colors are reflected by the light reflection plate 80 as white color consisting of these three colors uniformly mixed together, and again impinges upon the STN cell 20 through the reflection polarizing plate 40, the light polarizing plate 30 and the lower polarizing plate 15. At this time, the light impinging upon the STN cell 20 is white light reflected by the light reflection plate 80, so that the light output from the display device 10 is colored solely in the color of the color filter 27 it passes.

As a result, the light applied to the liquid crystal panel 140 from behind in reflection type display is white light, whereby it is possible to prevent color display from color inconsistency and realize a clear color display.

Figure 6:
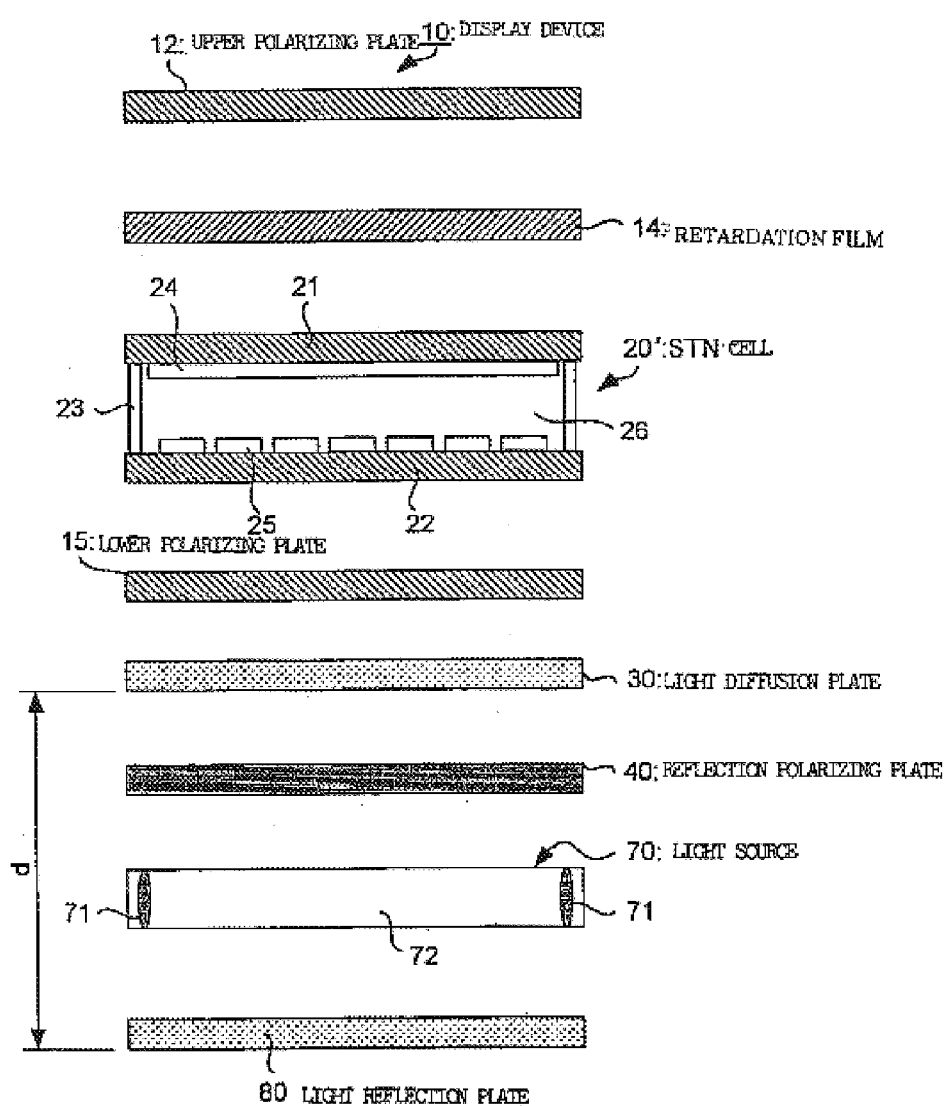
FIG. 6 is a schematic diagram showing the construction of a display device according to the second embodiment.

FIG. 6 is a schematic diagram showing a display device for black and white display according to a second embodiment. That is, in the display device 10, instead of the STN cell 20 having the color filter 27, an STN cell 20' not equipped with a color filter 27 is used. Further, below the STN cell 20', the lower polarizing plate 15, the light diffusion plate 30, the reflection polarizing plate 40, the light source 70 and the light reflection plate 80 are sequentially provided.

In this display device 10 of the second embodiment also, constructed as described above, light is sequentially reflected between the reflection polarizing plate 40 and the light reflection plate 80, as in the display device 10 of the first embodiment, causing only light having a linear polarization component in a predetermined direction to be applied from the reflection polarizing plate 40 to the STN cell 20', whereby it is possible to make the screen bright in reflection type display.

Further, the relationship between the haze value H of the light diffusion plate 30 and the distance d between the light diffusion plate 30 and the light reflection plate 80 satisfies formula (1), whereby when the light applied from the light diffusion plate 30 toward the light reflection plate 80 reaches the light reflection plate 80, it can be in a sufficiently diffused state, reducing the parallax generated during black and white display and making the screen display clear.

Figure 7:
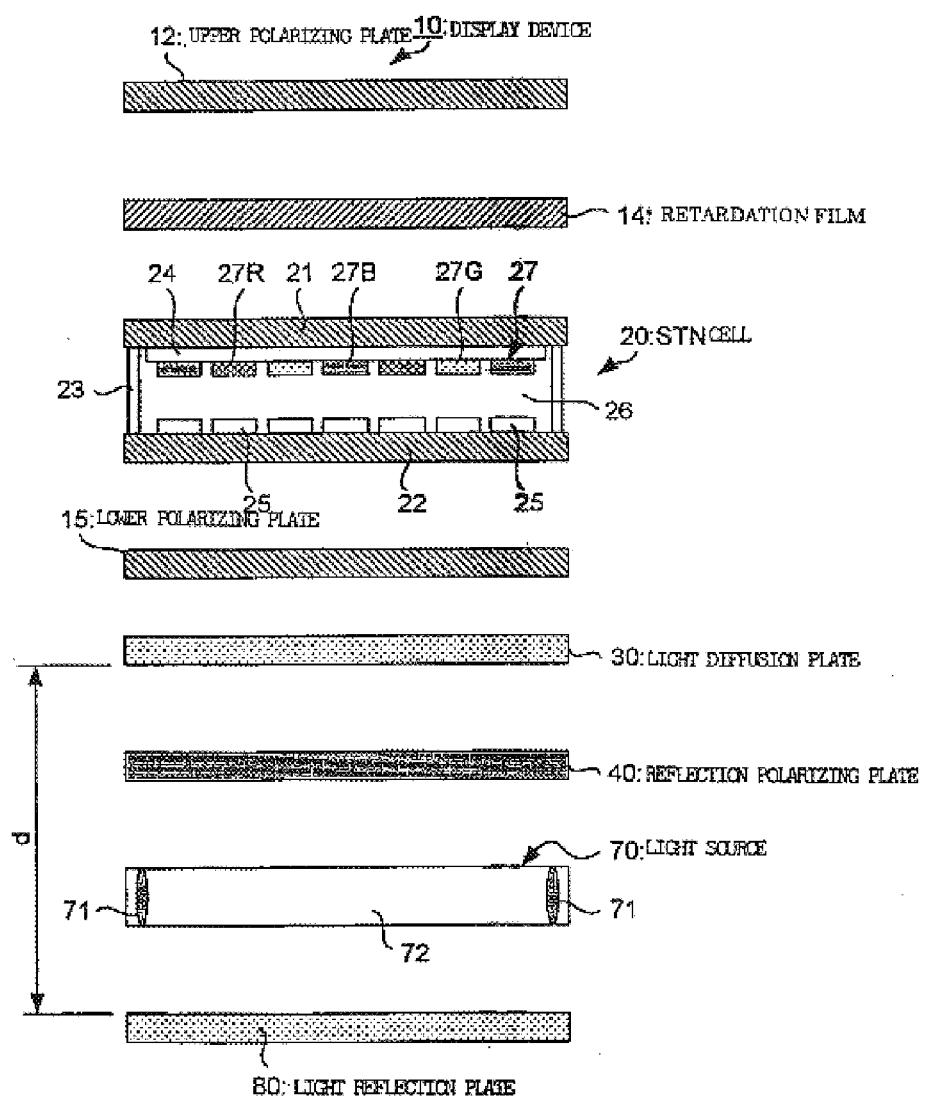
FIG. 7 is a schematic diagram showing the construction of a display device according to the third embodiment.

FIG. 7 is a schematic diagram showing a display device according to a third embodiment. In this embodiment, in the display device 10 of the first embodiment, the positions of the lower polarizing plate 15 and the light diffusion plate 30 are changed, the lower polarizing plate 15 and the light diffusion plate 30 being arranged in that order below the STN cell 20.

Figure 8:
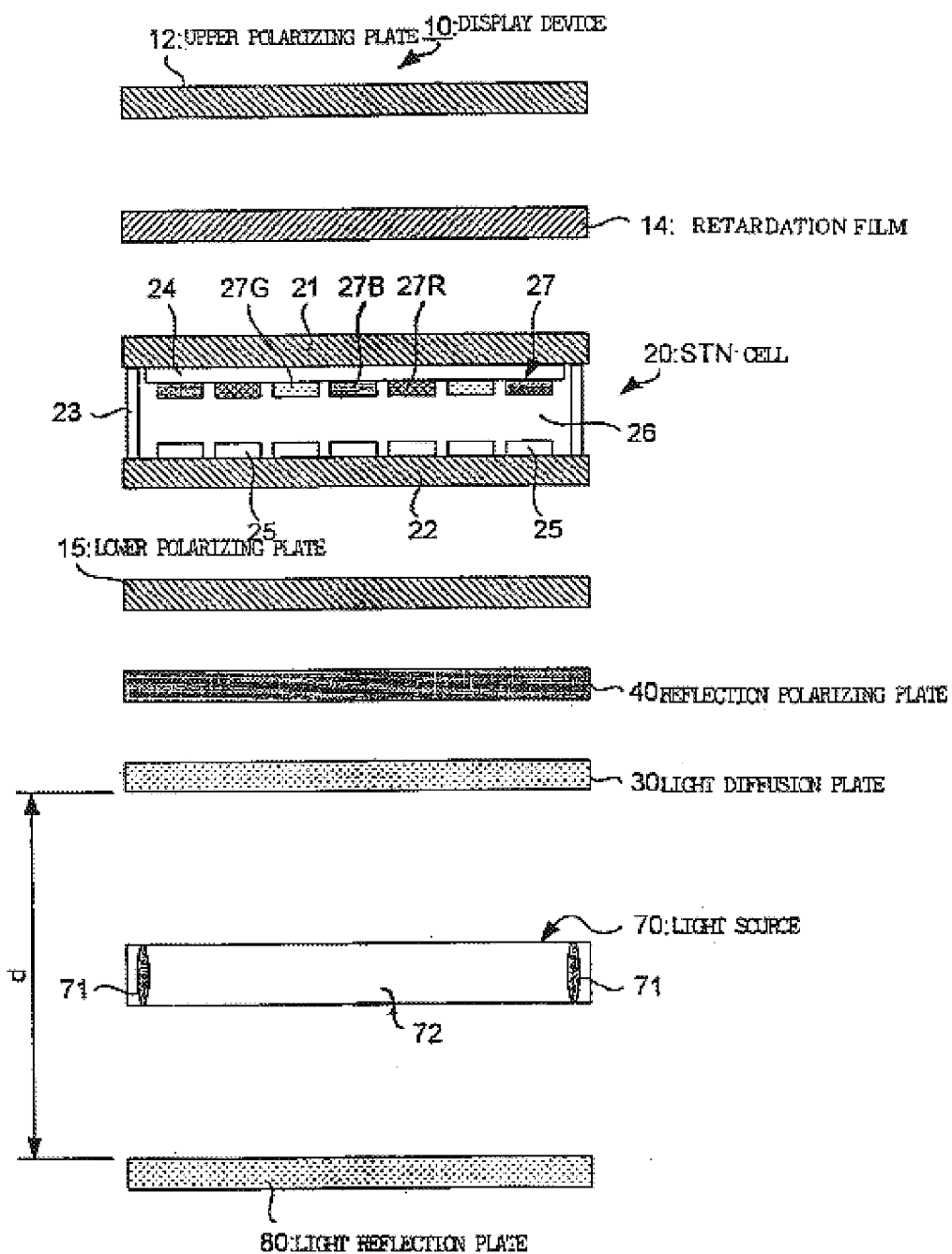
FIG. 8 is a schematic diagram showing the construction of a display device according to the fourth embodiment.

FIG. 8 is a schematic diagram showing a display device according to a fourth embodiment. In this embodiment, in the display device 10 of the third embodiment, the reflection polarizing plate 40 is arranged between the lower polarizing plate 15 and the light diffusion plate 30, the lower polarizing plate 15, the light reflection plate 40 and the light diffusion plate 30 being sequentially arranged below the STN cell 20.

Figure 9:
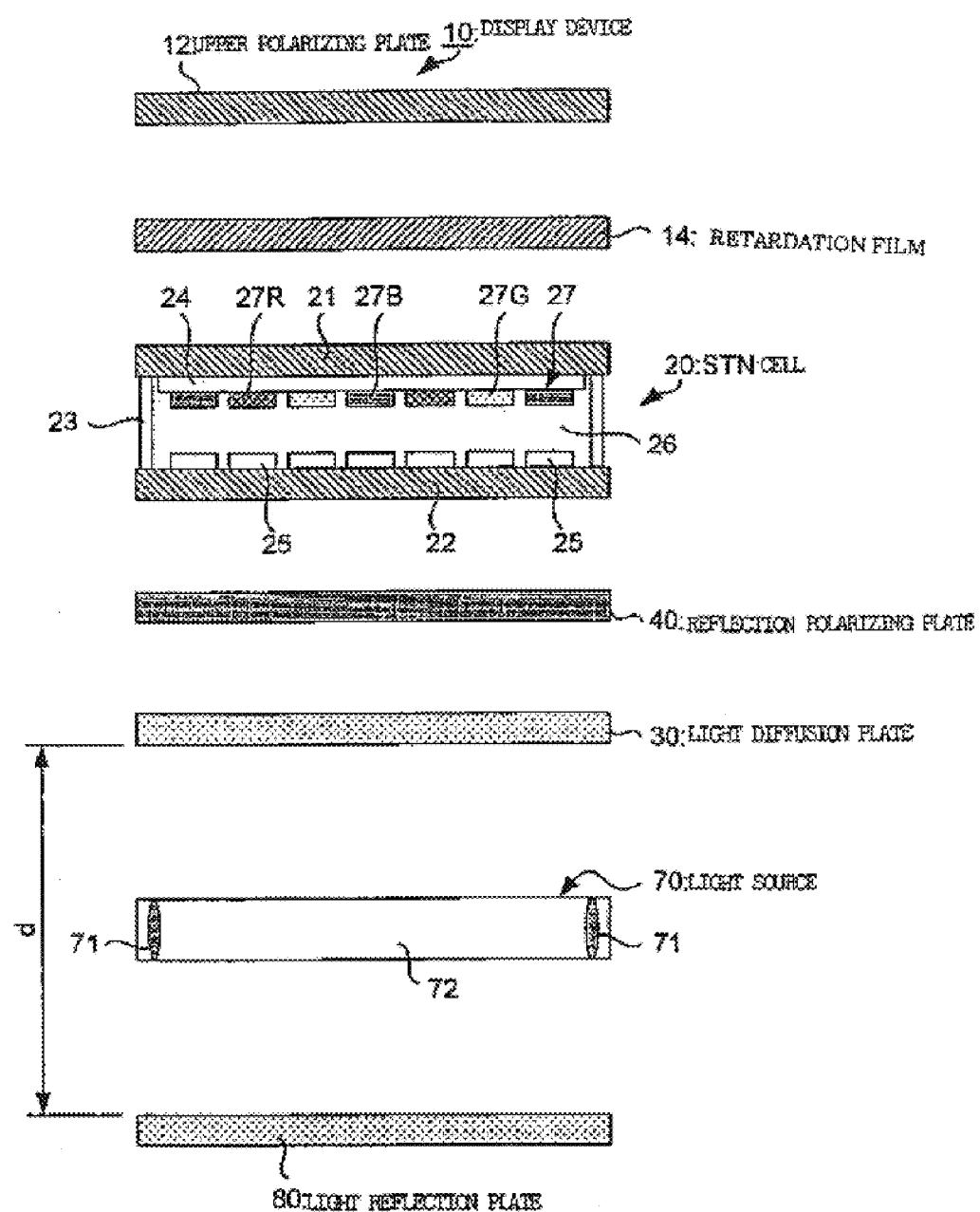
FIG. 9 is a schematic diagram showing the construction of a display device according to the fifth embodiment.
Figure 10:
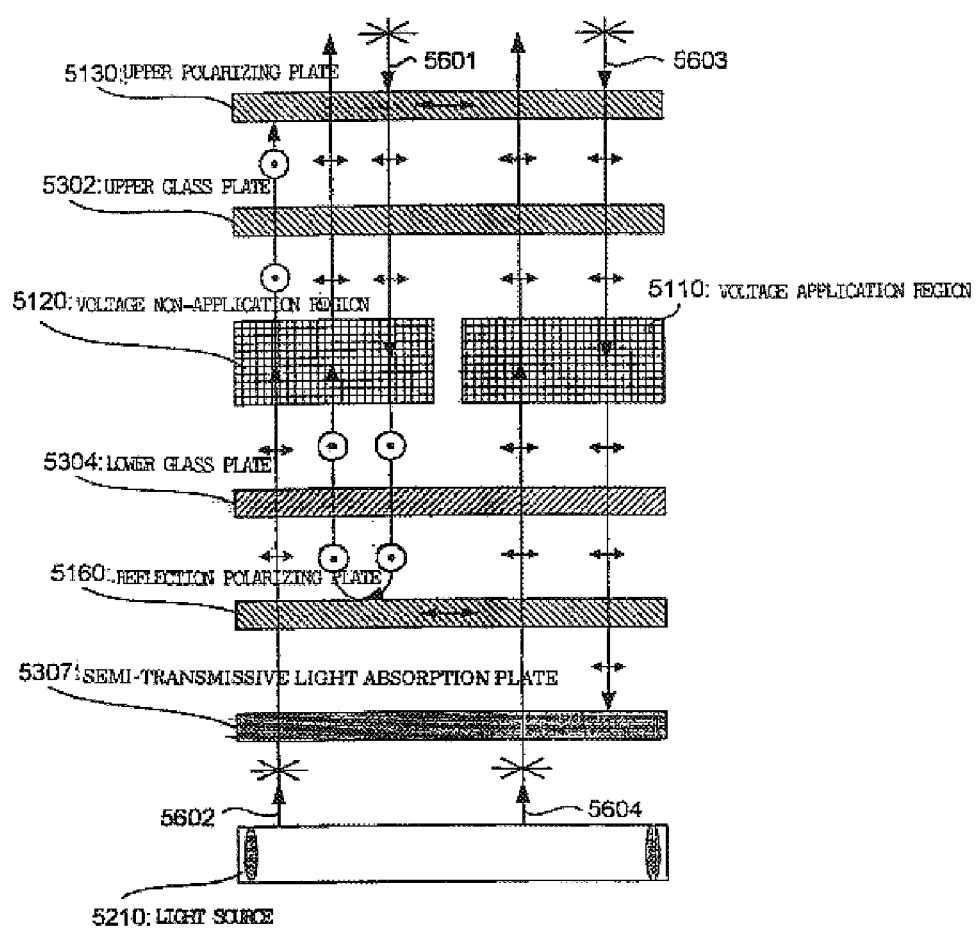
FIG. 10 is a schematic diagram showing the construction of a conventional display device.
Figure 11:
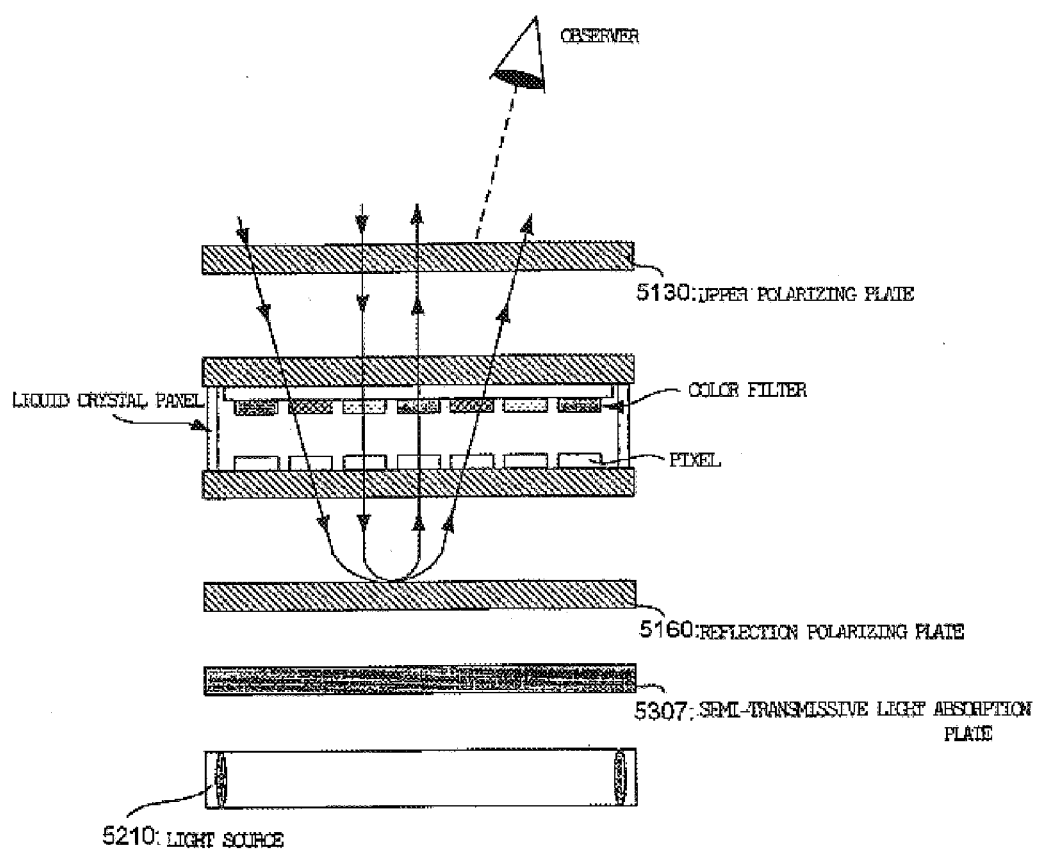
FIG. 11 is a diagram showing how parallax is generated in a conventional display device.

FIG. 9 is a schematic diagram showing a display device according to a fifth embodiment. In this embodiment, in the display device of the fourth embodiment, the lower polarizing plate 15 is omitted. In this way, in the display device of this embodiment, the number of members passed by the light is reduced, thereby making the display brighter.

While the above embodiments have been described with reference to the case in which the STN cell 20 is used in the liquid crystal panel, this should not be construed restrictively. Apart from TN liquid crystal panel, ECB liquid crystal panel, other types of panels will do as long as the transmission polarization axis can be varied through voltage, etc.

While a color display device has been described as the third to sixth embodiments, the present invention is naturally also applicable to a display device for black and white display described as the second embodiment.

Further, the above-described display device 10 is applicable to electronic apparatuses such as a personal computer, a pager, a liquid crystal television, a view finder type or monitor direct view type video tape recorder, a car navigation apparatus, an electronic notebook, a calculator, a word processor, a work station, a mobile phone, a picturephone, a POS terminal, and an apparatus equipped with a touch panel.

As described above, in the display device of the present invention, the relationship between the haze value H of the light diffusion means and the distance d between the light diffusion means and the light reflection means satisfies the formula: $H \geq -200d+140$, so that when effecting black and white display by reflection type display, it is possible for the light emitted from the light diffusion means toward the light reflection means to reach the light reflection means in a sufficiently diffused state, thereby making the display brighter and reducing parallax.

Further, when effecting color display, it is possible for the incident light colored in red, green and blue to reach the light reflection means in a sufficiently diffused state, and the light reflection means reflects the light as white light consisting of these colors uniformly mixed together, making it possible to realize a clear color display.

What is claimed is:

1. A display device comprising:
   a liquid crystal panel including a liquid crystal material;
   a first polarizer provided on one side of the liquid crystal panel, a light reflector provided on the other side of the liquid crystal panel;

an illuminating device having light guiding member and a light source capable of introducing light to the light guiding member, the illuminating device being arranged between the light diffuser and the light reflector;

a second polarizer provided between the liquid crystal panel and the illuminating device;

a color filter being equipped with a plurality of colors included red, green and blue colors, the color filter provided between the first polarizer and the light diffuser; and a light diffuser arranged between the liquid crystal panel and the light reflector, the light diffuser having forward scattering characteristics, the light diffuser scattering light colored with each a plurality of colors of the color filter forward the light reflector, a space between the light diffuser and the light reflector being a certain distance;

the light diffuser and the distance satisfying the following relationship;

$$H(\%) \geq -200d + 140 \text{(mm)}$$

wherein d is the distance between the light diffuser and the light reflector, and H is haze value of the light diffuser; and wherein $0.7\text{(mm)} \geq d \geq 0.2\text{mm(mm)}$.

2. A display device according to claim 1, further comprising a reflection polarizing plate provided between the second polarizer and the illuminating device, the reflection polarizing plate separating a reflecting light from a transmitting light depending on a polarization direction of the light;

the second polarizer substantially transmits a light of a first polarization direction and substantially absorbs a light of a second polarization direction different from the first polarization direction, wherein the first polarization direction of the second polarizer coinciding with the polarization direction transmitting the light of the reflection polarizing plate.

3. An electronic apparatus equipped with a display device according to claim 1.

4. A display device according to claim 1, further comprising a reflection polarizing plate between the liquid crystal panel and the light reflector, wherein the reflection polarizing plate substantially transmits a light of a first polarization direction and substantially reflects a light of a second polarization direction, the first and second polarization directions being different from one another.

5. A display device according to claim 1, wherein the display device further comprises at least one of a reflective type and a transflective type display device.

6. A display device adapted to provide both reflection type display and transmission type display, the device comprising:

a liquid crystal panel including a liquid crystal material and a color filter equipped with a plurality of colors included red, green and blue colors;

a first polarizer provided on a front side of the liquid crystal panel, an illuminating device adapted to illuminate the liquid crystal panel in a transmission type display mode;

the illuminating device including a light guiding member and a light source adapted to introduce light to the light guiding member;

a light reflector adapted to reflect an external light impinged upon the liquid crystal panel in a reflection type display mode, the light reflector positioned behind the illuminating device relative to the external light;

a second polarizer provided between the liquid crystal panel and the illuminating device, the second polarizer substantially transmits a light of a first polarization direction and substantially absorbs a light of a second polarization direction different from the first polarization direction; and a light diffuser arranged between the liquid crystal panel and the light reflector, the light diffuser having forward scattering characteristics, the light diffuser scattering light colored with each a plurality of colors of the color filter forward the light reflector in the reflection type display mode, a space between the light diffuser and the light reflector being a certain distance, the light diffuser and the distance satisfying the following relationship:

$$H(\%) \geq -200d + 140 \text{(mm)}$$

wherein d is the distance between the light diffuser and the light reflector, H is a haze value of the light diffuser, $0.3\text{mm} \leq d \leq 2.0\text{mm}$, and $5\% \leq H \leq 95\%$.

7. A display device according to claim 6, wherein the illuminating device is arranged between the light diffuser and the light reflector.

8. A display device according to claim 6, further comprising a reflection polarizing plate provided between the second polarizer and the illuminating device, the reflection polarizing plate separating light depending on a polarization direction of the light;

the second polarizer separating light depending on a polarization direction of the light;

a transmission axis of the second polarizer coinciding with a transmission axis of the reflection polarizing plate.

9. A display device according to claim 6, further comprising a reflection polarizing plate between the liquid crystal panel and the light reflector, wherein the reflection polarizing plate substantially transmits a light of a first polarization direction and substantially reflects a light of a second polarization direction, the first and second polarization directions being different from one another.

* * * * *

UNITED STATES PATENT AND TRADEMARK OFFICE
CERTIFICATE OF CORRECTION

PATENT NO. : 6,906,767 B1  Page 1 of 1
DATED : June 14, 2005
INVENTOR(S) : Chiyoaki Iijima It is certified that error appears in the above-identified patent and that said Letters Patent is hereby corrected as shown below:

<u>Column 4,</u>
Line 64, "socalled" should be -- so-called --.

<u>Column 11,</u>
Line 7, "X," should be -- $\lambda$, --.

<u>Column 15,</u>
Line 18, after "each" insert -- of --.

<u>Column 16,</u>
Line 25, after "each" insert -- of --.
Lines 46-47, delete "the second polarizer separating light depending on a polarization direction of the light;".

Signed and Sealed this

Thirtieth Day of May, 2006

JON W. DUDAS
*Director of the United States Patent and Trademark Office*